United States Patent
Watanabe (10) Patent No.: US 10,560,035 B2
(45) Date of Patent: Feb. 11, 2020

(54) DISCHARGE DEVICE, POWER SUPPLY APPARATUS, AND DISCHARGE METHOD WITH POWER SUPPLY CUT-OFF DETECTION AND CAPACITOR DISCHARGE

(71) Applicant: Sony Corporation, Tokyo (JP)

(72) Inventor: Hiroyuki Watanabe, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/741,546

(22) PCT Filed: May 16, 2016

(86) PCT No.: PCT/JP2016/002388
§ 371 (c)(1),
(2) Date: Jan. 3, 2018

(87) PCT Pub. No.: WO2017/010031
PCT Pub. Date: Jan. 19, 2017

(65) Prior Publication Data
US 2018/0198363 A1 Jul. 12, 2018

(30) Foreign Application Priority Data
Jul. 10, 2015 (JP) ................................. 2015-138785

(51) Int. Cl.
*H02M 7/12* (2006.01)
*H02J 9/06* (2006.01)
*H02M 1/32* (2007.01)

(52) U.S. Cl.
CPC ............. *H02M 7/125* (2013.01); *H02J 9/062* (2013.01); *H02M 2001/322* (2013.01)

(58) Field of Classification Search
CPC .. H02M 2001/322; H02M 7/12; H02M 7/125; H02M 7/217; H02J 9/062
See application file for complete search history.

(56) References Cited

U.S. PATENT DOCUMENTS 6,493,243 B1 * 12/2002 Real .................... H02J 9/062
307/66
9,252,669 B2 * 2/2016 Nate ..................... H02M 3/335
(Continued)

FOREIGN PATENT DOCUMENTS

CN 102263516 A 11/2011
CN 102647079 A 8/2012
(Continued)

OTHER PUBLICATIONS

International Search Report and English translation thereof dated Aug. 9, 2016 in connection with International Application No. PCT/JP2016/002388.
(Continued)

*Primary Examiner* — Jue Zhang
*Assistant Examiner* — Peter M Novak
(74) *Attorney, Agent, or Firm* — Wolf, Greenfield & Sacks, P.C.

(57) ABSTRACT

[Object]
[Solving Means] A discharge device includes a discharge unit and a cut-off detection unit. The discharge unit is configured to discharge a capacitor at a variable discharge current value on the basis of a voltage of a rectified signal obtained by full-wave rectifying an AC voltage input via an input filter including the capacitor. The cut-off detection unit is configured to monitor the voltage of the rectified signal and to detect whether or not a power supply is cut off on the basis of a change of the voltage when the capacitor is discharged by the discharge unit at a specific discharge current value.

12 Claims, 9 Drawing Sheets (56) References Cited

U.S. PATENT DOCUMENTS

| | | | | |
|---|---|---|---|---|
| 2007/0151272 A1* | 7/2007 | Cosan | ................... | F25B 49/025 |
| | | | | 62/228.1 |
| 2013/0083565 A1* | 4/2013 | Gaknoki | ................ | H02M 1/08 |
| | | | | 363/21.17 |
| 2013/0147440 A1 | 6/2013 | Shiroyama et al. | | |
| 2014/0070751 A1 | 3/2014 | Niwa et al. | | |
| 2016/0226371 A1* | 8/2016 | Tsou | ....................... | H02M 1/32 |

FOREIGN PATENT DOCUMENTS

| | | |
|---|---|---|
| CN | 102904465 A | 1/2013 |
| CN | 103081322 A | 5/2013 |
| JP | 2011-200034 A | 10/2011 |
| JP | 2012-023832 A | 2/2012 |
| JP | 2013-027283 A | 2/2013 |
| JP | 2014-054138 A | 3/2014 |
| WO | WO 2012/033120 A1 | 3/2012 |

OTHER PUBLICATIONS

Written Opinion and English translation thereof dated Aug. 9, 2016 in connection with International Application No. PCT/JP2016/002388.

International Preliminary Report on Patentability and English translation thereof dated Jan. 25, 2018 in connection with International Application No. PCT/JP2016/002388.

Chinese Office Action dated Jun. 27 , 2019 in connection with Chinese Application No. 201680039419.5 and English translation thereof.

* cited by examiner

DISCHARGE DEVICE, POWER SUPPLY APPARATUS, AND DISCHARGE METHOD WITH POWER SUPPLY CUT-OFF DETECTION AND CAPACITOR DISCHARGE

CROSS-REFERENCE TO RELATED APPLICATIONS

This application claims the benefit under 35 U.S.C. § 371 as a U.S. National Stage Entry of International Application No. PCT/JP2016/002388 filed in the Japanese Patent Office as a Receiving Office on May 16, 2016, which claims priority to Japanese Patent Application Number JP2015-138785, filed in the Japanese Patent Office on Jul. 10, 2015, each of which is hereby incorporated by reference in its entirety.

TECHNICAL FIELD

The present technology relates to a power supply apparatus, and a discharge device and a method thereof that are used in the power supply apparatus and for executing discharge.

BACKGROUND ART

A power supply apparatus is used in the related art in order to switch a pulsation input voltage obtained by full-wave rectifying an AC voltage supplied from an AC commercial power supply, generate a desirable DC voltage, and supply a load of an electrical appliance or the like with the DC voltage. The power supply apparatus includes a noise filter including a capacitor for the purpose of removing noises. For example, there are a number of power supply apparatuses including a power source cut-off detection circuit and a circuit for discharging a residual electric charge in order to safely deal with the residual electric charge accumulated on the capacitor of the noise filter, in a case where a plug of the power supply apparatus is unplugged from a plug outlet (for example, see Patent Literatures 1 and 2).

The power source cut-off detection circuit acquires the pulsation input voltage by full-wave rectifying the AC voltage supplied from the commercial power supply using two diodes, for example. Such a power source cut-off detection circuit generally detects the power source cut-off by detecting no pulsation input voltage or detecting that a voltage signal that smoothes the pulsation input voltage is lowered. After the power source cut-off is detected, a discharge circuit discharges the capacitor of the input filter via the two diodes and discharge resistances (for example, see Patent Literature 1, specification, paragraphs [0032] and [0036], and FIG. 2).

Figure 1:
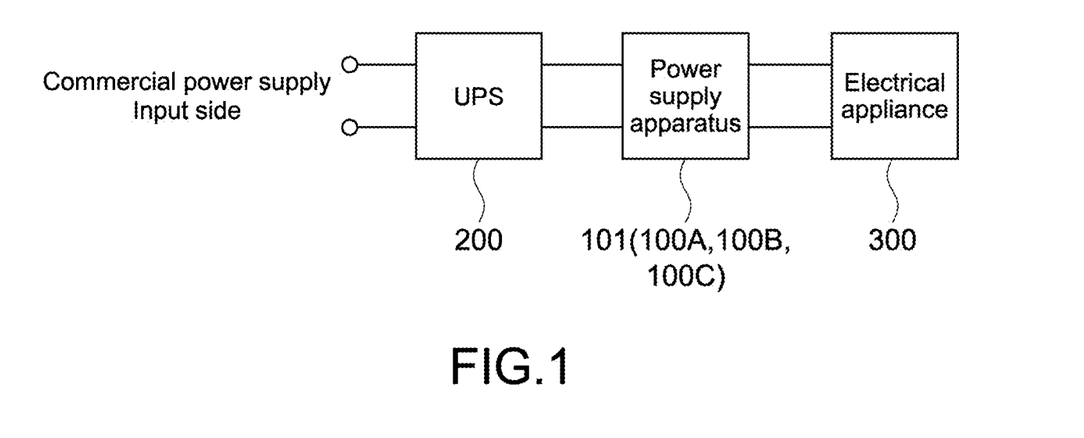
FIG. 1 is a block diagram showing a configuration of a system using an UPS.

Incidentally, power from the commercial power supply may not be stably supplied due to a power failure, an instantaneous voltage drop, or the like. In such a case, an uninterruptible power supply (source) apparatus (UPS) may be used in order to stably supply the electrical appliance with power. FIG. 1 is a block diagram showing a configuration of a system using the UPS. An UPS 200 is connected between the commercial power supply and a power supply apparatus 101. When the power supply from the commercial power supply is interrupted, the UPS 200 supplies an electrical appliance 300 with the AC voltage generated from electrical energy accumulated in a battery of the UPS 200 in place of the AC voltage supplied from the commercial power supply.

Figure 2:
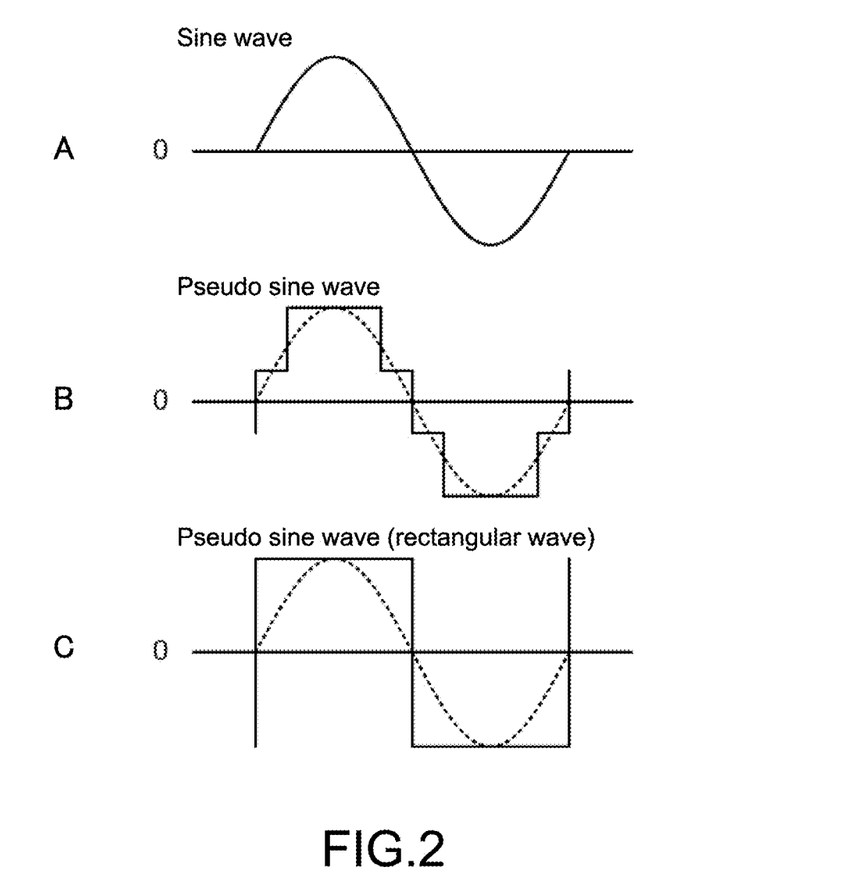

A waveform of the AC voltage that is supplied to the electrical appliance 300 from the UPS 200 depends on products. FIG. 2A shows a sine wave of an AC voltage from a commercial power supply, for example. FIGS. 2B and C show illustrative pseudo sine waves output from the UPS 200, respectively. As shown in FIG. 2C, an UPS product of one example supplies the electrical appliance 300 with power by a rectangular wave voltage.

CITATION LIST

Patent Literature

Patent Literature 1: Japanese Patent Application Laid-open No. 2013-27283
Patent Literature 2: Japanese Patent Application Laid-open No. 2012-23832

DISCLOSURE OF INVENTION

Technical Problem

Figure 3:
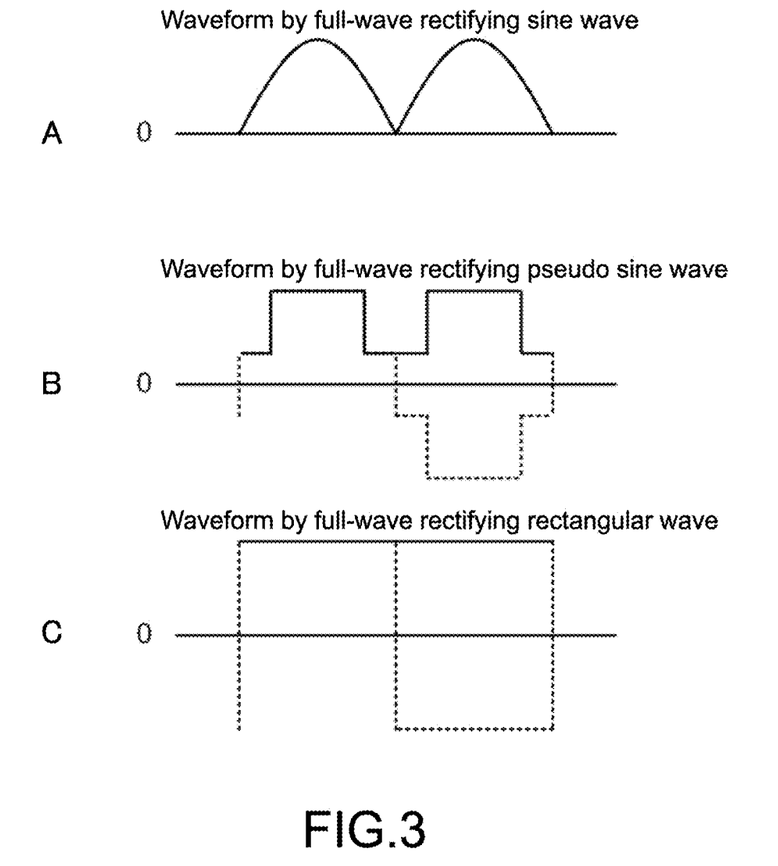
FIGS. 3A to C show full-wave rectified waveforms of the waveforms shown in FIGS. 2A to C, respectively.

FIGS. 3A to C show full-wave rectified waveforms of the waveforms shown in FIGS. 2A to C, respectively. In a case where the rectangular wave voltage shown in FIG. 2C is input to the power source cut-off detection circuit, the full-wave rectified waveform obtained by the two diodes has not the pulsation voltage waveform but the DC voltage, as shown in FIG. 3C. At this time, the power source cut-off detection circuit determines that no pulsation voltage is input while the power is supplied from the UPS 200, misdetects that the power source is cut-off, and discharges the capacitor.

It is an object of the present disclosure to provide a power supply apparatus, a discharge device, and a discharge method that can reliably detect whether or not a power supply is cut off without depending on a waveform of a signal obtained by full-wave rectification.

Solution to Problem

In order to achieve the above-described object, a discharge device according to an embodiment of the present technology includes a discharge unit and a cut-off detection unit.

The discharge unit is configured to discharge a capacitor at a variable discharge current value on the basis of a voltage of a rectified signal obtained by full-wave rectifying an AC voltage input via an input filter including the capacitor.

The cut-off detection unit is configured to monitor the voltage of the rectified signal and to detect whether or not a power supply is cut off on the basis of a change of the voltage when the capacitor is discharged by the discharge unit at a specific discharge current value.

By the cut-off detection unit, a change of the voltage of the rectified signal is monitored when the capacitor is discharged at the specific discharge current value of the variable discharge current values. Accordingly, the discharge device can reliably detect whether or not the power supply is cut off without depending on the waveform of the rectified signal obtained by full-wave rectification.

The cut-off detection unit may include a pulsation detection circuit and a DC voltage monitor circuit.

The pulsation detection circuit is configured to detect whether or not the rectified signal is pulsation by monitoring the voltage.

The DC voltage monitor circuit is configured to monitor a voltage of a rectified signal of non-pulsation in a case where the non-pulsation is detected by the pulsation detection circuit.

The discharge unit may be configured to discharge the capacitor at a first discharge current value in a case where the non-pulsation is detected by the pulsation detection circuit.

The discharge unit may be configured to discharge the capacitor at the second discharge current value after a predetermined time elapses from the start of the discharge at the first discharge current value.

Thus, even in a case where the power is supplied from an UPS, the operation of the power supply by the UPS continues, as the capacitor is discharged at the second discharge current value lower than the first discharge current value.

The discharge unit may be configured to discharge the capacitor at a second discharge current value lower than the first discharge current value after the discharge unit discharges the capacitor at the first discharge current value.

Under the status that the capacitor is discharged at the second discharge current value, in a case where the voltage of the rectified signal has a value equal to or less than a threshold value, it can be seen that the power supply from the UPS is cut-off. Accordingly, in this case, by discharging the capacitor at the first discharge current value, discharging processing can be completed until the voltage level reaches a safe voltage level for a user.

The discharge unit may be configured to discharge the capacitor at the second discharge current value after a predetermined time elapses from the start of the discharge at the first discharge current value.

The discharge unit may include a first discharge path having a first resistor, and a second discharge path having a second resistor having a resistance value different from a resistance value of the first resistor.

The first discharge path may be configured to use a charge path capable of charging the discharge device.

The discharge unit may include a discharge path having a variable resistor.

The discharge unit may include a current source, and a circuit that variably controls the discharge current value by the current source.

By discharging the capacitor at different discharge current values at different timings, the cut-off detection unit can monitor each way of discharging. Accordingly, the discharge device can reliably detect whether or not the power supply is cut off without depending on the waveform of the rectified signal obtained by full-wave rectification.

A power supply apparatus according to an embodiment of the present technology includes an input filter, a converter, a full wave rectifier unit, and the discharge unit.

The input filter includes a capacitor.

The converter is configured to convert an AC voltage input via the input filter into a DC voltage.

The full wave rectifier unit is configured to full-wave rectify the AC voltage input via the input filter.

A discharge method according to the present technology includes monitoring a voltage of a rectified signal obtained by full-wave rectifying an AC voltage input via an input filter including a capacitor.

The capacitor is discharged at a specific discharge current value of variable discharge current values on the basis of the voltage of the rectified signal.

It is detected whether or not a power supply is cut off on the basis of a change of the voltage of the rectified signal when the capacitor is discharged by the discharge unit at the specific discharge current value.

Advantageous Effects of Invention

As described above, according to the present technology, it can reliably detect whether or not the power supply is cut off without depending on the waveform of the rectified signal obtained by full-wave rectification.

It is noted that effects described herein are not necessarily limited, and there may be effects other than those described in the present disclosure.

BRIEF DESCRIPTION OF DRAWINGS

FIG. 2A shows a sine wave of an AC voltage from a commercial power supply. FIGS. 2B and C show illustrative pseudo sine waves output from the UPS, respectively.

MODE(S) FOR CARRYING OUT THE INVENTION

Hereinafter, embodiments of the present technology will be described with reference to the drawings.

1. First Embodiment 1.1) Configuration of Power Supply Apparatus

Figure 4:
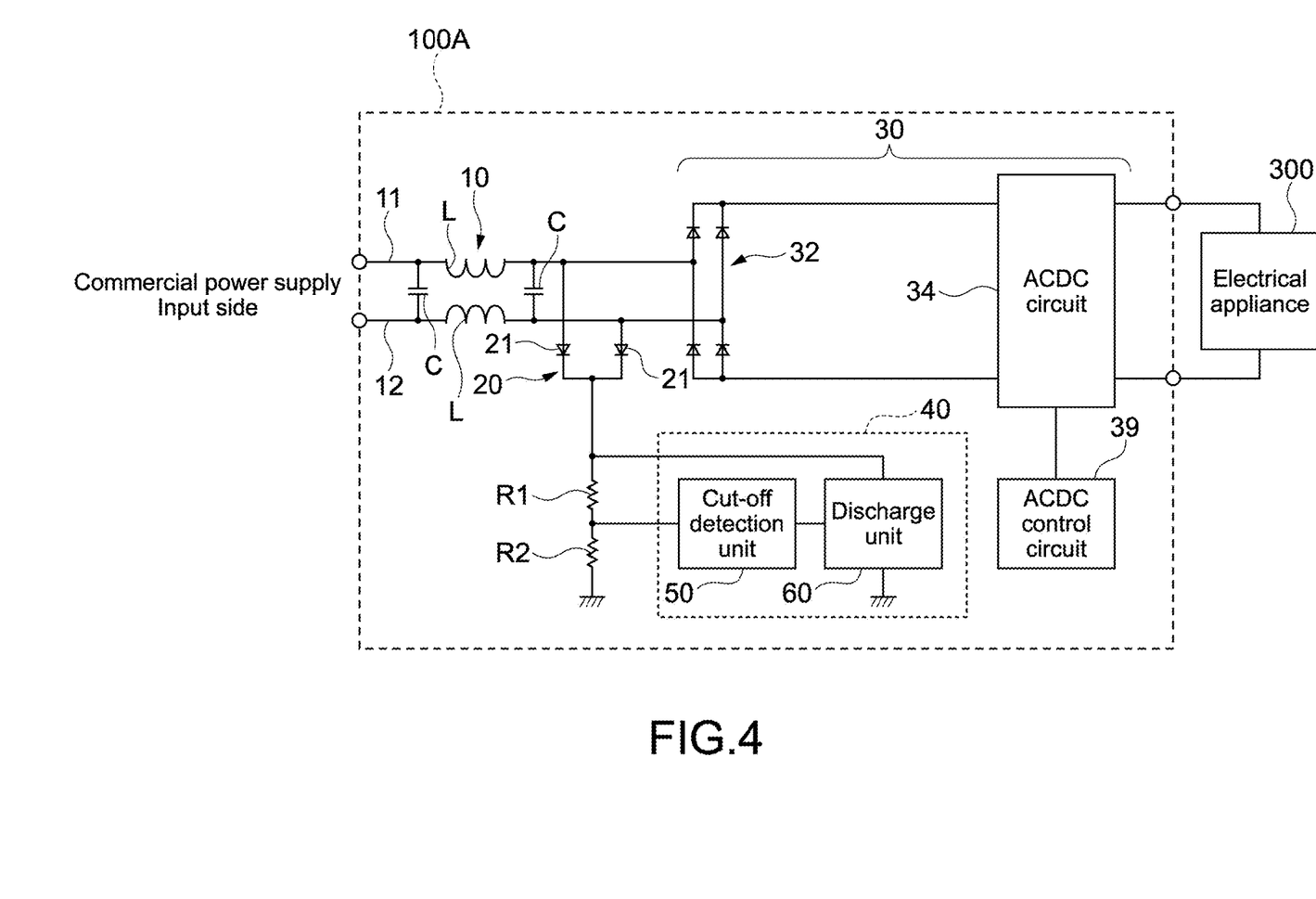
FIG. 4 shows a circuit configuration of a power supply apparatus according to a first embodiment of the present technology.

FIG. 4 shows a circuit configuration of a power supply apparatus according to a first embodiment of the present technology. A power supply apparatus 100A includes an input filter circuit 10, a converter 30, a full wave rectifier unit 20 for monitoring a voltage, an ACDC control circuit 39, dividing resistors R1 and R2, and a discharge device 40. The power supply apparatus 100A is connectable to a commercial power supply (not shown), e.g., power receptacle, at an input side, and to an electrical appliance 300 at an output side. An AC voltage of the commercial power supply is 100V to 240V, for example.

The input filter circuit 10 has a function to remove noises in the input AC voltage. The input filter circuit 10 includes common mode choke coils L wound around a first line (Line) 11 and a second line (Natural) 12, and capacitors C, for example. The capacitors C are called as X capacitors, across-the-line capacitors, or the like. The configuration of the input filter circuit 10 is not limited to the configuration shown in FIG. 4, and the input filter circuit 10 may have a variety of known circuit configurations.

The converter 30 includes a rectification unit 32 and an ACDC circuit 34. The rectification unit 32 includes a bridge diode having a function to full-wave rectify an AC voltage input, for example. The ACDC circuit 34 includes a smoothing circuit that smoothes a DC voltage of pulsation rectified by the rectification unit 32, and a transformer that converts the DC voltage smoothed by the smoothing circuit into a desirable voltage value. The smoothing circuit and the transformer are not shown.

The ACDC control circuit 39 has a function to control the ACDC circuit 34, and controls an output voltage from the ACDC circuit 34 by a switching control, for example.

The full wave rectifier unit 20 for monitoring the voltage has a function to full-wave rectify the AC voltage output from the input filter circuit 10. The full wave rectifier unit 20 includes two diodes 21. Anodes of the diodes 21 are connected to the first line 11 and the second line 12, respectively, and cathodes thereof are connected to a discharge unit 60 of the discharge device 40 and to the discharge device 40 via the dividing resistor R1. Since the full wave rectifier unit 20 has this configuration, the rectified signal full-wave rectified has a pulsation waveform as shown in FIG. 3A.

The discharge device 40 includes a cut-off detection unit 50 (monitor unit) and the above-described discharge unit 60. The dividing resistors R1 and R2 divide the voltage of the rectified signal lower than a withstand voltage level of the cut-off detection unit 50. The voltage of the rectified signal divided is input to the cut-off detection unit 50 as a voltage signal for monitoring (hereinafter referred to as a monitoring signal).

Figure 5:
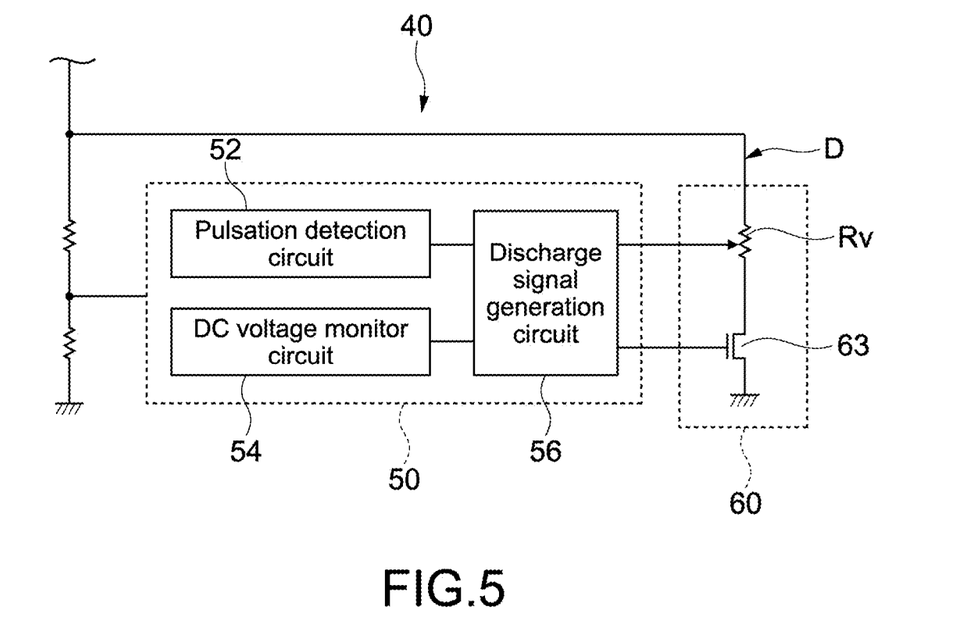
FIG. 5 shows configurations of a cut-off detection unit and a discharge unit shown in FIG. 4.

FIG. 5 mainly shows the configurations of the cut-off detection unit 50 and the discharge unit 60. The cut-off detection unit 50 includes a pulsation detection circuit 52, a DC voltage monitor circuit 54, and a discharge signal generation circuit 56. The cut-off detection unit 50 is configured to monitor the voltage of the input monitoring signal, and to detect whether or not a power supply is cut off on the basis of a change of the monitoring signal when the capacitor is discharged by the discharge unit 60 at a specific discharge current value.

The pulsation detection circuit 52 has a function to detect whether or not the monitoring signal is pulsation. For example, the pulsation detection circuit 52 includes a timer and one or more comparators (not shown). The comparator has a function to compare the voltage of the monitoring signal with the reference voltage. The reference voltage is set between 40% and 80% of the maximum value of the monitoring signal (pulsation voltage), for example.

For example, the pulsation detection circuit 52 can detect that the monitoring signal is pulsation where any one of the condition that a monitoring signal voltage is lower than the reference voltage within a timer setting period and the condition that the monitoring signal voltage is higher than the reference voltage within the timer setting period is satisfied. On the other hand, the pulsation detection circuit 52 can detect that the monitoring signal is non-pulsation where the condition that the monitoring signal voltage is not lower and not higher than the reference voltage within the timer setting period is satisfied.

The pulsation detection circuit 52 may include a plurality of comparators, and the comparators may be configured to use different reference voltages. In this case, the pulsation detection circuit 52 can detect that the monitoring signal is pulsation where any one of the condition that the monitoring signal voltage is lower than the minimum value of the different reference voltage values and the condition that the monitoring signal voltage is higher than the maximum value of the different reference voltage values is satisfied.

Alternatively, the pulsation detection circuit 52 may be configured to detect absence or presence of the pulsation using a delta modulation type or a parallel comparison (flash) type AD converter, for example.

The DC voltage monitor circuit 54 is configured to monitor the voltage of the monitoring signal of non-pulsation (DC) in a case where the pulsation detection circuit 52 detects that the input monitoring signal is non-pulsation. The DC voltage monitor circuit 54 includes a comparator, for example, and detects that the monitoring signal voltage is lower than a threshold value by comparing the reference voltage (threshold value voltage) with the monitoring signal voltage. The threshold value voltage is set between 40% and 60% of the maximum value of the monitoring signal, for example.

The discharge signal generation circuit 56 has a function to generate a discharge signal and output the discharge signal to the discharge unit 60 in a case where the pulsation detection circuit 52 detects that the monitoring signal is non-pulsation, or in a case where the DC voltage monitor circuit 54 detects that the monitoring signal voltage is lower than the threshold value. In addition, the discharge signal generation circuit 56 has a function to determine a resistance value of a variable resistor Rv of the discharge unit 60.

The discharge unit 60 includes the above-described variable resistor Rv and a switch 63, and a discharge path D connected to ground, for example. The discharge unit 60 turns on the switch 63 by the discharge signal output from the discharge signal generation circuit 56, and discharges at any resistance value, i.e., any discharge current value set by the discharge signal generation circuit 56. In this manner, a residual electric charge of the capacitor C is discharged.

Note that, in FIG. 1, at least one of the cut-off detection unit 50, the discharge unit 60, and the ACDC control circuit 39 may be an IC (Integrated Circuit). Alternatively, one IC may include at least two of them.

1.2) Operation of Power Supply Apparatus 1.2.1) In a Case Where No UPS is Used

Figure 6:
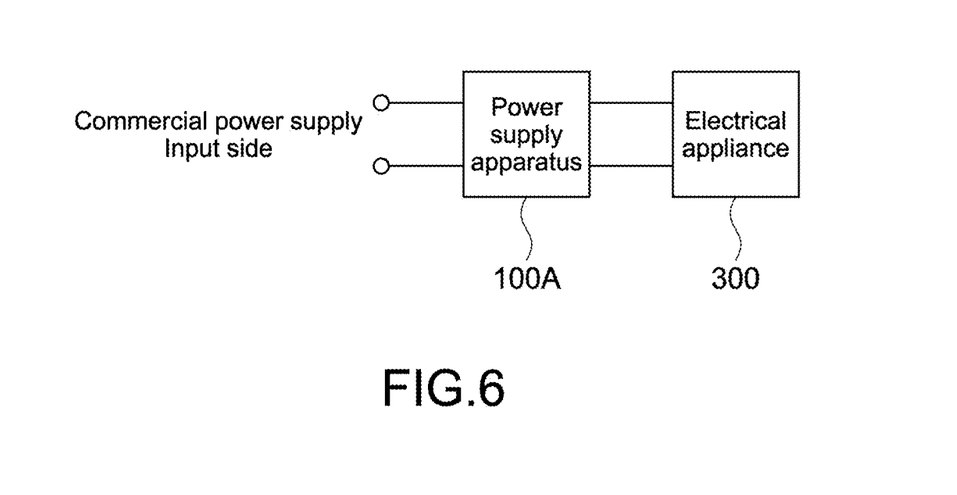
FIG. 6 shows a configuration example of a power supply system where the power supply apparatus shown in FIG. 4 is connected to a commercial power supply via no UPS.
Figure 7:
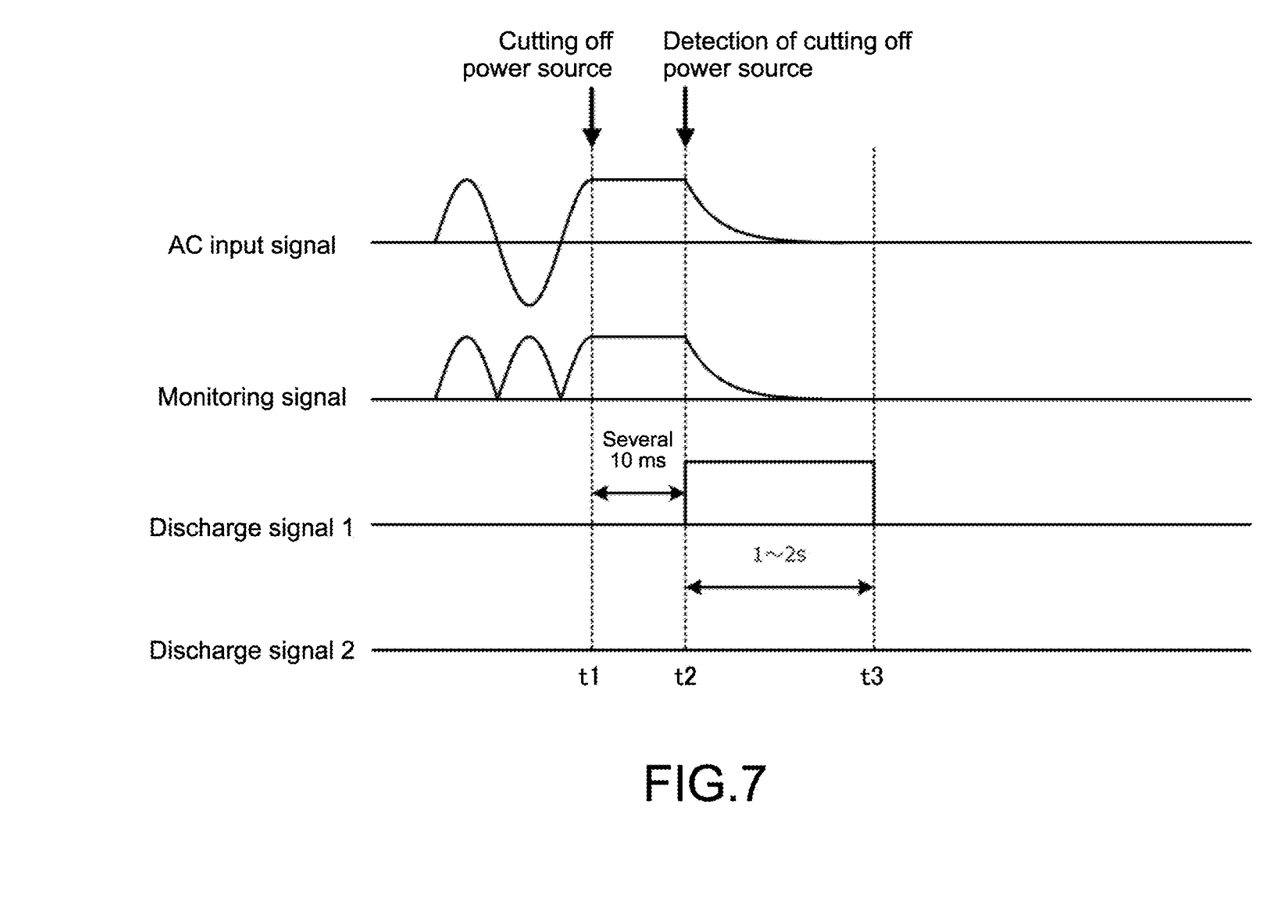
FIG. 7 shows voltage signal waveforms when the power supply apparatus connected to the commercial power supply is operated using no UPS.

FIG. 6 shows a configuration example of a power supply system where the power supply apparatus 100A is connected to a commercial power supply via no UPS. FIG. 7 shows voltage signal waveforms when the power supply apparatus 100A connected to the commercial power supply is operated using no UPS.

FIG. 7 shows an input signal of an AC voltage (signal input to the full wave rectifier unit 20), the monitoring signal, a discharge signal 1, and a discharge signal 2, in descending order. A high level of the discharge signal 1 corresponds to an ON signal input to the switch 63 under the status that the variable resistor Rv is set to have a relatively low resistance value (corresponding to a first discharge current value). A high level of the discharge signal 2 corresponds to an ON signal input to the switch 63 under the status that the variable resistor Rv is set to have a relatively high resistance value (corresponding to a second discharge current value lower than the first discharge current value). For example, the relatively low resistance value is set to kΩ order (e.g., 60 kΩ). For example, the relatively high resistance value is set to MΩ order (e.g., 1 MΩ).

As shown in FIG. 7, it is assumed that a power source (power supply) is cut off because of a power failure or a power receptacle unplugged, for example, at the timing t1 of the maximum level of the monitoring signal voltage. Note that it is only one example that the timing of cutting off the power source coincides with the timing of the maximum level of the monitoring signal voltage.

If the power source is cut off because of the power failure or the power receptacle unplugged, residual charges of the capacitor C maintain a constant voltage when the power source is cut off. The monitoring signal voltage shows a constant voltage value, too. In this case, where the pulsation detection circuit 52 detects that the monitoring signal voltage is not higher than and is not lower than the reference voltage within a period set by the timer (for example, several tens ms), the pulsation detection circuit 52 determines that the monitoring signal voltage is non-pulsation.

At the timing t2 after the period set by the timer elapses, the discharge signal generation circuit 56 outputs a discharge signal 1 for discharging the capacitor C at the first discharge current value to the switch 63 of the discharge unit 60. The output of the discharge signal 1 continues until the timing t3. The period provided for in each country's laws or rules (1 to 2 s) or more is set for the period of the output of the discharge signal 1, and the capacitor C is discharged within the period.

Thus, in a case where no UPS is used, discharging can be performed until the voltage level reaches a safe voltage level for a user by discharging once at the first discharge current value (no second discharge current value is used).

1.2.2) In a Case Where UPS is Used

Figure 8:
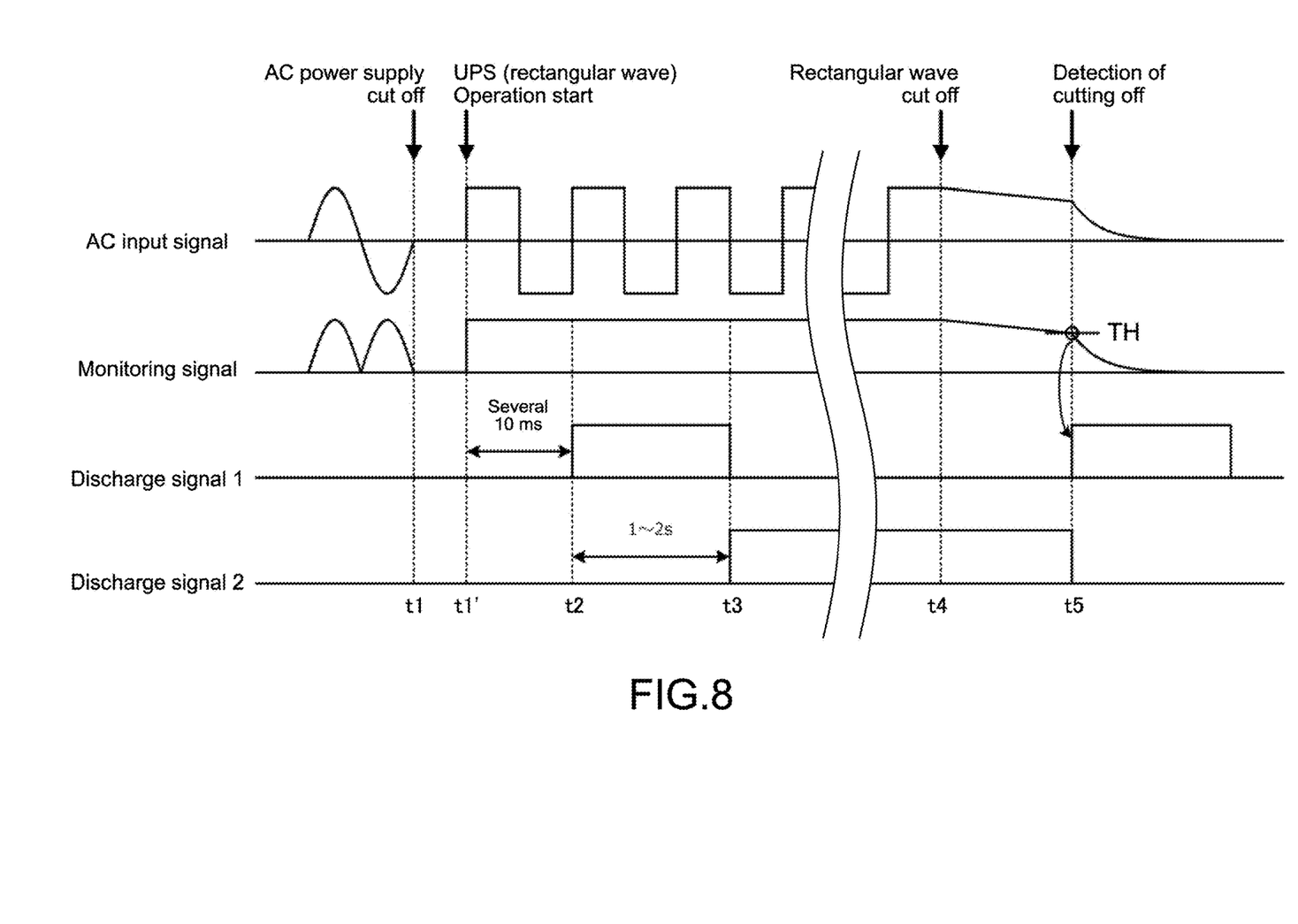
FIG. 8 shows voltage signal waveforms when the power supply apparatus connected to the commercial power supply is operated via the UPS.

Next, an operation of the power supply apparatus 100A using the UPS 200 will be described. In this case, a configuration example of the system is as shown in FIG. 1. Specifically, the power supply apparatus 100A according to this embodiment is connected between the UPS 200 and the electrical appliance 300. FIG. 8 shows voltage signal waveforms upon the operation of the power supply apparatus 100A. An output waveform of the AC voltage of the UPS 200 is here a rectangular wave.

Where an AC power supply is cut off from the commercial power supply at the timing t1, the UPS 200 detects it. Here, in a way of example, the power source is cut-off where the voltage is substantially zero. Once the UPS 200 detects the power source cut off, the UPS 200 starts output of the AC voltage with the rectangular wave at the timing t1'. The period from the t1 to the t1' depends on the functionality and settings of the UPS 200.

As described above, when the rectangular wave is full-wave rectified by the full wave rectifier unit 20, the signal is converted into a non-pulsation DC signal. In this case, similar to the embodiment shown in FIG. 7, the pulsation detection circuit 52 detects that the input monitoring signal is non-pulsation within the period set by the timer (for example, several tens ms) from the timing t1 or t1' (in this case, from the timing t1'). Thus, the pulsation detection circuit 52 outputs the discharge signal 1 for discharging the capacitor C at the first discharge current value at the timing t2, and the discharge unit 60 performs discharging.

Note that FIG. 8 shows an example that the period from the timing t1' to the t2 corresponds to one cycle of the rectangular wave of the UPS 200, but it is only one example.

Even though the discharging is performed at the first discharge current value, the UPS 200 continues the power supply. Therefore, the monitoring signal voltage is substantially unchanged and a constant value is output.

Since the timer is set by the pulsation detection circuit 52, after the predetermined time (for example, 1 to 2 s) elapses from the timing t2, the discharge signal generation circuit 56 outputs a discharge signal 2 for discharging the capacitor C at a second discharge current value lower than the first discharge current value at the timing t3. Even though the discharging is performed at the second discharge current value lower than the first discharge current value, since the UPS 200 continues the power supply, the non-pulsation DC voltage is continuously input to the discharge device 40 while a predetermined voltage drop occurs. In other words, in this case, the cut-off detection unit 50 can determine that the power source is not cut off.

The second discharge current value (resistance value by the variable resistor Rv corresponding to the second discharge current value) is set to the value such that the operation of the electrical appliance 300 can be continued where the power is continuously supplied from the UPS 200 even if the voltage drop as a result of the discharge occurs.

Under the status that the UPS 200 supplies the power supply apparatus 100A with power, the DC voltage monitor circuit 54 monitors the monitoring signal voltage since the monitoring signal voltage is non-pulsation. In a case where the power supply from the UPS 200 is then cut off at the timing t4, the discharge device 40 operates as follows.

Before and after the timing t4, the discharge signal 2 is continuously output, and the discharging is performed at the second discharge current value. Accordingly, in a case where the power supply from the UPS 200 is cut off (timing t5), an input voltage and the monitoring signal voltage are gradually lowered. In a case where the DC voltage monitor circuit 54 detects that the monitoring signal voltage has a value equal to or less than the threshold value TH, the discharge signal generation circuit 56 stops the discharge signal 2, and outputs the discharge signal 1. Specifically, it switches from the second discharge current value to the first discharge current value. In this manner, the capacitor C is discharged at the first discharge current value, discharging processing is completed until the voltage level reaches a safe voltage level for a user.

Note that examples of the case where the power supply from the UPS 200 is cut off include a case where the battery of the UPS 200 is substantially unremained or a case where the power receptacle of the power supply apparatus 100A is unplugged from the UPS 200, for example.

In this embodiment, the discharge signal 2 is output within the predetermined time after the discharging with the discharge signal 1 is started at the timing t2. However, after the discharging with the discharge signal 1 is started at the timing t2, the DC voltage monitor circuit 54 monitors the monitoring signal voltage, and the cut-off detection unit 50 can detect whether or not the power source is cut off (in this case, power source is cut off from the UPS 200) on the basis of (a change of) the detected voltage. In a case where it is determined that the power source is not cut off from the UPS 200, as shown in the timing t2 of FIG. 2, where the power is supplied from the UPS 200, the discharge signal generation circuit 56 may stop the discharge signal 1 and output the discharge signal 2.

As described above, in this embodiment, a change of the monitoring signal voltage is monitored when the capacitor C is discharged at the specific discharge current value (first discharge current value or second discharge current value) of the variable discharge current values. Accordingly, the cut-off detection unit 50 can reliably detect whether or not the power supply is cut off without depending on the waveform of the rectified signal obtained by full-wave rectification.

Also, a general power supply apparatus (power supply apparatus having no variable discharge current value) continues discharging at a large constant discharge current value where the power supply from the commercial power supply is cut off during the operation of the UPS 200. Accordingly, a large amount of power is lost and heat is generated, which is a problem, during the operation of the UPS 200. In contrast, in the power supply apparatus 100A according to this embodiment, by appropriately setting the resistance value of the variable resistor Rv corresponding to the second discharge current value, the power loss can be reduced (for example, about several tens mW), and no heat generation problem occurs.

2. Second Embodiment

Next, a power supply apparatus according to a second embodiment of the present technology will be described. In the following description, substantially the same elements, functions, etc. included in the power supply apparatus 100A according to the first embodiment are denoted by the similar reference signs, and description thereof will be omitted or simplified, and different configurations will be mainly described.

Figure 9:
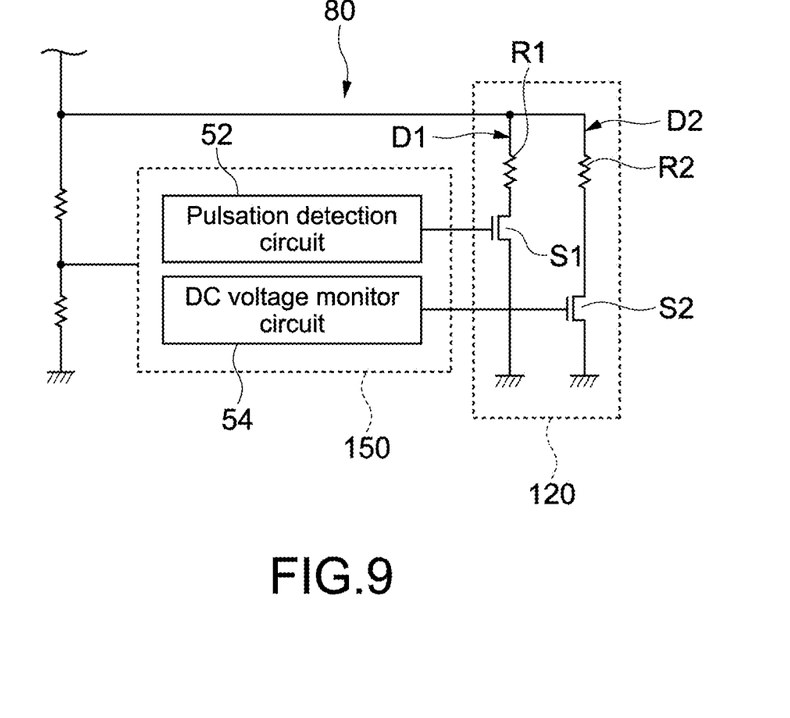
FIG. 9 shows a configuration of a discharge device according to a second embodiment of the present technology.

FIG. 9 shows a configuration of a discharge device 80 according to this embodiment. The configurations of the discharge device 80 are similar to those of the discharge device 40 according to the first embodiment except for the discharge device 40. The discharge device 80 includes a cut-off detection unit 150 and a discharge unit 120 similar to those of the first embodiment. The discharge unit 120 includes a plurality of discharge paths and, in this embodiment, two discharge paths, i.e., a first discharge path D1 and a second discharge path D2. The first discharge path D1 and the second discharge path D2 are connected in parallel to the full wave rectifier unit 20 (see FIG. 4) at the output side, for example.

The first discharge path D1 includes a fixed first resistor R1 and a first switch S1. The second discharge path D2 includes a fixed second resistor R2 and a second switch S2. The first resistor R1 has a resistance value different from a resistance value of the second resistor R2. Specifically, the resistance value of the first resistor R1 is smaller than the resistance value of the second resistor R2. For example, the resistance value of the first resistor R1 is set to kΩ order (e.g., 60 kΩ). The resistance value of the second resistor R2 is set to MΩ order (e.g., 1 MΩ).

The pulsation detection circuit 52 is configured to output the discharge signal 1 to a first switch S1 of the first discharge path D1. In addition, the DC voltage monitor circuit 54 is configured to output the discharge signal 2 to a second switch S2 of the second discharge path D2. The pulsation detection circuit 52 and the DC voltage monitor circuit 54 output the discharge signals 1 and 2 at the operation timings similar to those shown in FIG. 7 and FIG. 8, and provide the functions and the effects similar to those of the first embodiment.

3. Third Embodiment

Figure 10:
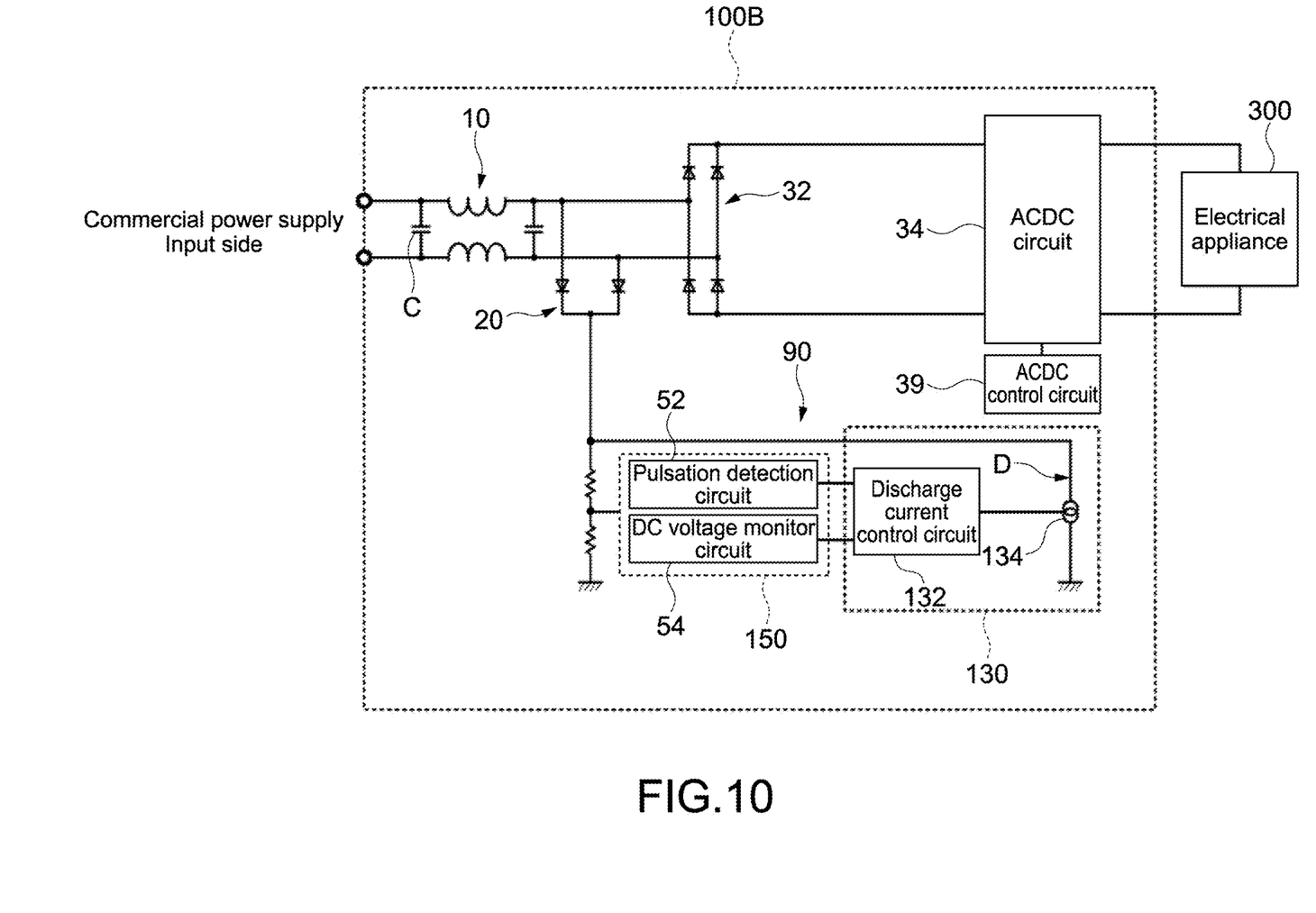
FIG. 10 shows a configuration of a power supply apparatus according to a third embodiment of the present technology.

FIG. 10 shows a configuration of a discharge device of a power supply apparatus according to a third embodiment of the present technology. A discharge path D of a discharge unit 130 of a discharge device 90 of a power supply apparatus 100B includes a current source 134. The discharge device 90 includes a discharge current control circuit 132, and the discharge current control circuit 132 is configured to receive an output signal from the cut-off detection unit 150, generate control signals of a discharge current, and output the control signals to the current source 134. Output signals from the pulsation detection circuit 52 and the DC voltage monitor circuit 54 of the cut-off detection unit 150 are input to the discharge current control circuit 132.

The current source 134 has a function to discharge a residual electric charge of the capacitor C at a variable discharge current value in accordance with the control signals from the discharge current control circuit 132. The control signals from the discharge current control circuit 132 are a control signal 1 and a control signal 2, for example. A high level of the control signal 1 corresponds to the high level of the discharge signal 1 of the above-described embodiment. A high level of the control signal 2 corresponds to the high level of the discharge signal 2 of the above-described embodiment. If both of the control signals 1 and 2 have low levels, the discharge current value of the current source 134 is set to nearly 0 A.

The discharge device 90 configured as described above can be operated to output the control signals 1 and 2 on the basis of the output signals from the cut-off detection unit 150 at the operation timings similar to those shown in FIG. 7 and FIG. 8.

4. Fourth Embodiment

Figure 11:
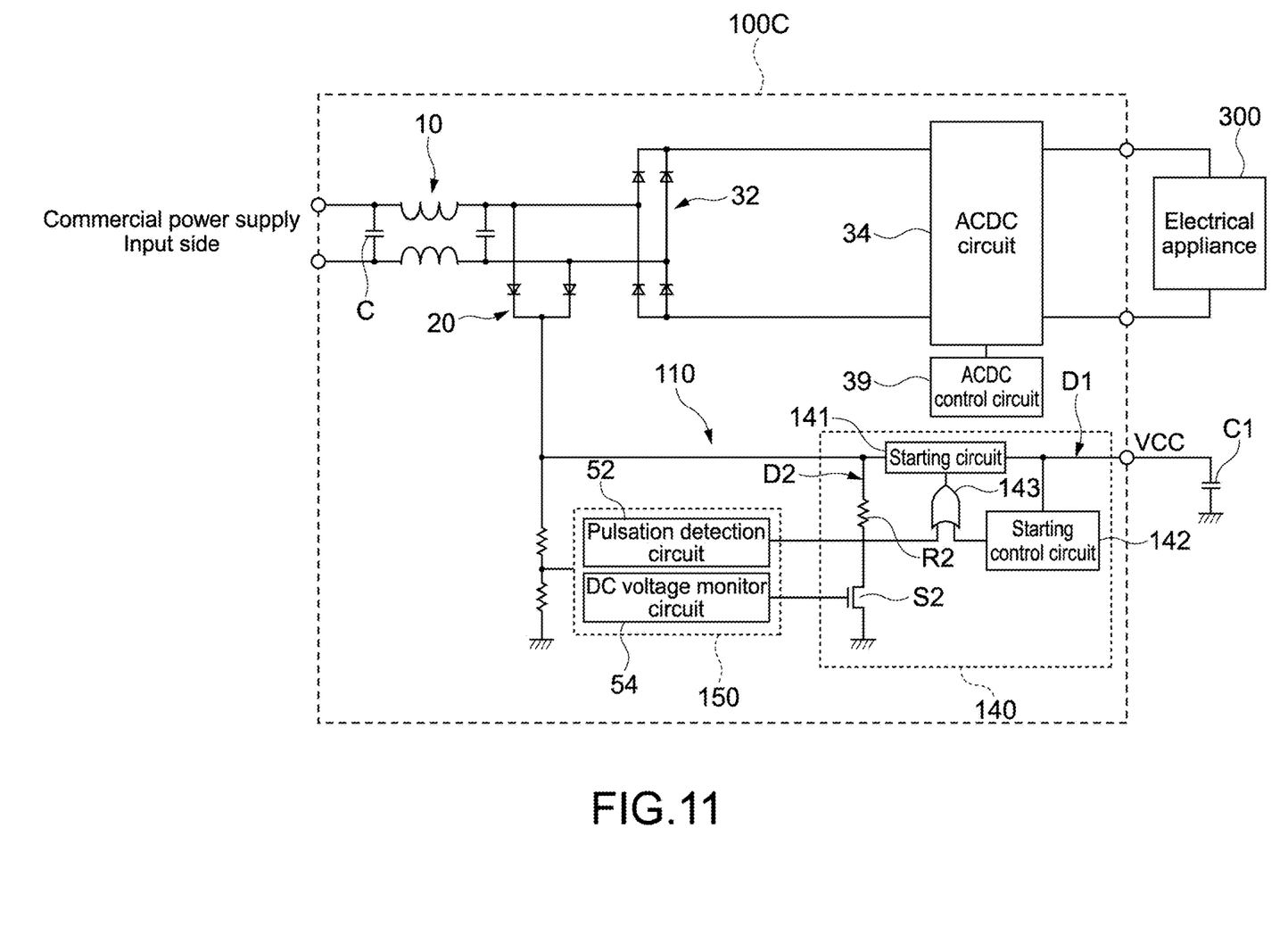
FIG. 11 shows a configuration of a power supply apparatus according to a fourth embodiment of the present technology.

FIG. 11 shows a configuration of a discharge device of a power supply apparatus according to a fourth embodiment of the present technology. A discharge unit 140 of a discharge device 110 of a power supply apparatus 100C includes a discharge path D1 and a discharge path D2. The discharge path D2 includes a resistor R2 having a relatively high resistance value (for example, MΩ order) and a switch S2. The switch S2 of the discharge path D2 is turned on by the discharge signal 2 similar to the respective above-described embodiments.

The discharge path D1 supplies a VCC with an electric power via the full wave rectifier unit 20 upon a startup of the power supply apparatus 100C (discharge device 110) and charges the capacitor C1. Energy of the capacitor C1 drives the ACDC control circuit 39 to start up the ACDC circuit 34. After the startup of the ACDC circuit 34 is completed, the electric power is supplied to a VCC terminal from auxiliary winding (AUX; Auxiliary) of the transformer included in the ACDC circuit 34 to charge the capacitor C1.

The discharge path D1 includes a startup circuit 141 that starts up the discharge device 110 and is connected in parallel to a second discharge path D2 at an output side of the full wave rectifier unit 20. The startup circuit 141 is connected to the ground via the VCC terminal and the capacitor C1, and is connected to a starting coil of the ACDC circuit 34 via a line (not shown). The startup circuit 141 includes a resistor for discharging (not shown) (functioning as a first resistor having a relatively low resistance value).

A starting control circuit 142 is a circuit for controlling the startup circuit 141. A logical arithmetic circuit 143 turns on a switch 63 in the startup circuit 141 when the control signals are received from the starting control circuit 142 or when the signals are received from the pulsation detection circuit 52. Specifically, the startup circuit 141 uses the discharge path D1 as the charge path when the logical arithmetic circuit 143 receives the control signals from the starting control circuit 14. On the other hand, the startup circuit 141 uses the charge path as the discharge path D1 when the logical arithmetic circuit 143 receives the discharge signal 1 from the cut-off detection unit 150 (pulsation detection circuit 52).

The discharge device 110 having the above-described configuration can output the control signals 1 and 2 on the basis of the output signals from the cut-off detection unit 150 at the operation timings similar to those shown in FIG. 7 and FIG. 8.

The charge path and the startup circuit 141 may be included in general products. The discharge device 110 according to this embodiment uses the charge path and the startup circuit 141, and has an advantage that it is unnecessary to provide a new and independent discharge path D1.

5. Various Other Embodiments

The present technology is not limited to the embodiments as described above, and other various embodiments may be available.

In the above-described respective embodiments, two-level values, i.e., the high discharge current value and the low discharge current value, are described as the variable discharge current values, but three-level or more discharge current values may be set.

A typical example of the electrical appliance 300 is a PC. Other examples include a server, home appliances, or a device with no computer function.

It is possible to combine at least two features from the above-described features of the respective embodiments.

The present technology may also have the following configurations.

(1) A discharge device, including:
a discharge unit configured to discharge a capacitor at a variable discharge current value on the basis of a voltage of a rectified signal obtained by full-wave rectifying an AC voltage input via an input filter including the capacitor; and
a cut-off detection unit configured to monitor the voltage of the rectified signal and to detect whether or not a power supply is cut off on the basis of a change of the voltage when the capacitor is discharged by the discharge unit at a specific discharge current value.

(2) The discharge device according to (1), in which
the cut-off detection unit includes
a pulsation detection circuit configured to detect whether or not the rectified signal is pulsation by monitoring the voltage, and
a DC voltage monitor circuit configured to monitor a voltage of a rectified signal of non-pulsation in a case where the non-pulsation is detected by the pulsation detection circuit.

(3) The discharge device according to (2), in which
the discharge unit is configured to discharge the capacitor at a first discharge current value in a case where the non-pulsation is detected by the pulsation detection circuit.

(4) The discharge device according to (3), in which
the discharge unit is configured to discharge the capacitor at a second discharge current value lower than the first discharge current value after the discharge unit discharges the capacitor at the first discharge current value.

(5) The discharge device according to (4), in which
the discharge unit is configured to discharge the capacitor at the first discharge current value in a case where it is determined that the voltage of the rectified signal has a value equal to or less than a threshold value by the DC voltage monitor circuit under the status that the capacitor is discharged at the second discharge current value.

(6) The discharge device according to (4) or (5), in which
the discharge unit is configured to discharge the capacitor at the second discharge current value after a predetermined time elapses from the start of the discharge at the first discharge current value.

(7) The discharge device according to any one of (1) to (6), in which
the discharge unit includes
a first discharge path having a first resistor, and
a second discharge path having a second resistor having a resistance value different from a resistance value of the first resistor.

(8) The discharge device according to (7), in which
the first discharge path is configured to use a charge path capable of charging the discharge device.

(9) The discharge device according to any one of (1) to (6), in which
the discharge unit includes a discharge path having a variable resistor.

(10) The discharge device according to any one of (1) to (6), in which
the discharge unit includes
a current source, and
a circuit that variably controls the discharge current value by the current source.

(11) A power supply apparatus, including:
an input filter including a capacitor;
a converter configured to convert an AC voltage input via the input filter into a DC voltage;
a full wave rectifier unit configured to full-wave rectify the AC voltage input via the input filter;
a discharge unit configured to discharge the capacitor at a variable discharge current value on the basis of a voltage of a rectified signal obtained by the full wave rectifier unit; and
a cut-off detection unit configured to monitor the voltage of the rectified signal and to detect whether or not a power supply is cut off on the basis of a change of the voltage when the capacitor is discharged by the discharge unit at a specific discharge current value.

(12) A discharge method, including:
monitoring a voltage of a rectified signal obtained by full-wave rectifying an AC voltage input via an input filter including a capacitor;
discharging the capacitor at a specific discharge current value of variable discharge current values on the basis of the voltage of the rectified signal; and
detecting whether or not a power supply is cut off on the basis of a change of the voltage of the rectified signal when the capacitor is discharged by the discharge unit at the specific discharge current value.

REFERENCE SIGNS LIST 10 input filter circuit
20 full wave rectifier unit
30 converter
40, 80, 90, 110 discharge device
50, 150 cut-off detection unit
52 pulsation detection circuit
54 DC voltage monitor circuit
56 discharge signal generation circuit
60, 120, 130, 140 discharge unit
100A, 100B, 100C power supply apparatus
132 discharge current control circuit
134 current source
200 UPS
300 electrical appliance
C capacitor
D, D1, D2 discharge path
Rv variable resistor

The invention claimed is:

1. A discharge device, comprising:
a discharge unit configured to discharge a capacitor at a variable discharge current value on the basis of a voltage of a rectified signal obtained by full-wave rectifying an AC voltage input via an input filter including the capacitor; and
a cut-off detection unit configured to monitor the voltage of the rectified signal and to detect that a power supply which provides the AC voltage input is not cut off when pulsation of the rectified signal is not detected and the voltage of the rectified signal is greater than a threshold value during discharge of the capacitor by the discharge unit at a specific discharge current value.

2. The discharge device according to claim 1, wherein the cut-off detection unit includes
 a pulsation detection circuit configured to detect whether or not the rectified signal is pulsation by monitoring the voltage, and
 a DC voltage monitor circuit configured to monitor a voltage of a rectified signal of non-pulsation in a case where the non-pulsation is detected by the pulsation detection circuit.

3. The discharge device according to claim 2, wherein the discharge unit is configured to discharge the capacitor at a first discharge current value in a case where the non-pulsation is detected by the pulsation detection circuit.

4. The discharge device according to claim 3, wherein the discharge unit is configured to discharge the capacitor at a second discharge current value lower than the first discharge current value after the discharge unit discharges the capacitor at the first discharge current value.

5. The discharge device according to claim 4, wherein the discharge unit is configured to discharge the capacitor at the first discharge current value in a case where it is determined that the voltage of the rectified signal has a value equal to or less than the threshold value by the DC voltage monitor circuit when the capacitor is discharged at the second discharge current value.

6. The discharge device according to claim 4, wherein the discharge unit is configured to discharge the capacitor at the second discharge current value after a predetermined time elapses from a start of the discharge at the first discharge current value.

7. The discharge device according to claim 1, wherein the discharge unit includes
 a first discharge path having a first resistor, and
 a second discharge path having a second resistor having a resistance value different from a resistance value of the first resistor.

8. The discharge device according to claim 7, wherein the first discharge path is configured to use a charge path capable of charging the discharge device.

9. The discharge device according to claim 1, wherein the discharge unit includes a discharge path having a variable resistor.

10. The discharge device according to claim 1, wherein the discharge unit includes
 a current source, and
 a circuit that variably controls the discharge current value by the current source.

11. A power supply apparatus, comprising:
 an input filter including a capacitor;
 a converter configured to convert an AC voltage input via the input filter into a DC voltage;
 a full wave rectifier unit configured to full-wave rectify the AC voltage input via the input filter;
 a discharge unit configured to discharge the capacitor at a variable discharge current value on the basis of a voltage of a rectified signal obtained by the full wave rectifier unit; and
 a cut-off detection unit configured to monitor the voltage of the rectified signal and to detect that a power supply which provides the AC voltage input is not cut off when pulsation of the rectified signal is not detected and the voltage of the rectified signal is greater than a threshold value during discharge of the capacitor by the discharge unit at a specific discharge current value.

12. A discharge method, comprising:
 monitoring a voltage of a rectified signal obtained by full-wave rectifying an AC voltage input via an input filter including a capacitor;
 discharging the capacitor at a specific discharge current value of variable discharge current values on the basis of the voltage of the rectified signal; and
 detecting that a power supply which provides the AC voltage input is not cut off when pulsation of the rectified signal is not detected and the voltage of the rectified signal is greater than a threshold value during discharge of the capacitor by the discharge unit at the specific discharge current value.

* * * * *